(12) United States Patent
Duelli

(10) Patent No.: US 6,899,316 B2
(45) Date of Patent: May 31, 2005

(54) CLOSURE DEVICE FOR VACUUM CLOSURE OF AT LEAST ONE OPENING IN A WALL

(75) Inventor: Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 126 days.

(21) Appl. No.: 10/414,613

(22) Filed: Apr. 16, 2003

(65) Prior Publication Data

US 2004/0206925 A1 Oct. 21, 2004

(51) Int. Cl.[7] .................................................. F16K 3/18
(52) U.S. Cl. ........................................ 251/158; 251/62
(58) Field of Search ................................ 251/158, 167, 251/193, 195, 197, 198, 199, 214, 62

(56) References Cited

U.S. PATENT DOCUMENTS

| 3,307,574 | A | * | 3/1967 | Anderson | 251/62 |
| 3,379,405 | A | * | 4/1968 | Natho | 251/63.6 |
| 3,624,802 | A | * | 11/1971 | Ripert | 251/62 |
| 3,958,592 | A | * | 5/1976 | Wells et al. | 137/315.3 |
| 4,157,169 | A | * | 6/1979 | Norman | 251/195 |
| 4,773,440 | A | * | 9/1988 | Yanagawa et al. | 251/214 |
| 6,056,266 | A | | 5/2000 | Blecha | |
| 6,427,973 | B1 | | 8/2002 | Wagner | |

FOREIGN PATENT DOCUMENTS

DE          196 33 798          2/1998

* cited by examiner

*Primary Examiner*—Eric Keasel
(74) *Attorney, Agent, or Firm*—Reed Smith LLP

(57) ABSTRACT

A closure device for a vacuum closure of at least one opening in a wall having a valve place, at least one piston-cylinder unit, at least one carrier unit, at least one cylinder bore hole, at least two sealing rings, and a line. The valve plate is associated with an opening and is displaceable between an open position in which it releases the opening, a position in which it covers the opening but is raised from the wall and a closed position in which it covers the opening and contacts the wall. The at least one piston-cylinder unit serves to displace the valve to the different positions and includes a pneumatically actuated piston. At least one carrier unit is connected to a piston rod which serves to displace the valve to the different positions.

13 Claims, 14 Drawing Sheets

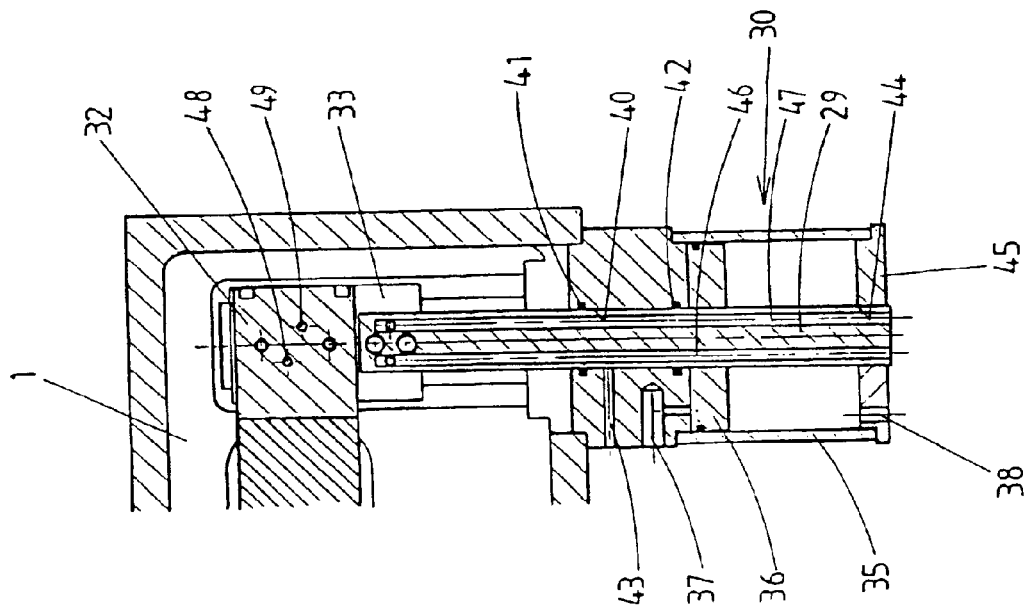
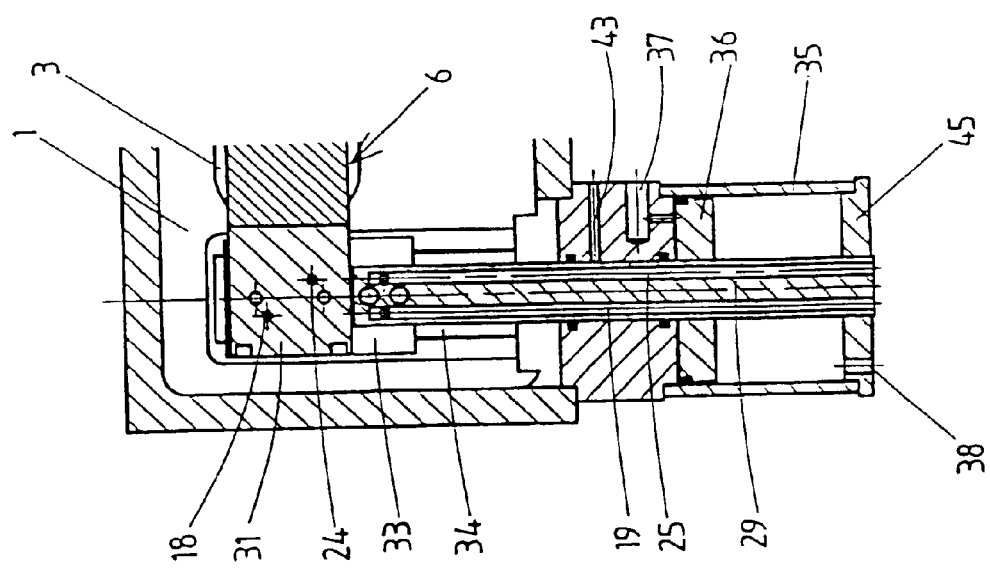
Fig. 11

CLOSURE DEVICE FOR VACUUM CLOSURE OF AT LEAST ONE OPENING IN A WALL

BACKGROUND OF THE INVENTION a) Field of the Invention

The invention is directed to a closure device for vacuum closure of at least one opening in a wall, comprising a valve plate which is associated with a respective opening and which is displaceable between an open position in which it releases the opening, a position in which it covers the opening but is raised from the wall, and a closed position in which it covers the opening and contacts the wall, at least one piston-cylinder unit which serves to displace the valve plate between its open position and its position in which it covers the opening but is raised from the wall and which comprises a pneumatically actuated piston which is arranged in a cylinder housing and which is outfitted with a piston rod leading out of the cylinder housing through a bore hole, at least one carrier unit which is connected to the piston rod of the at least one piston-cylinder unit and which is associated with a respective valve plate, has at least one cylinder bore hole in which is arranged a pneumatically actuated piston which serves to displace the valve plate between its position in which it covers the opening but is raised from the wall and its closed position and which is outfitted with a piston rod leading out of the carrier unit through a bore hole, the valve plate being fastened to this piston rod.

b) Description of the Related Art

A closure device of the type mentioned above is known from U.S. Pat. No. 6,056,266 A. This closure device serves particularly as a door on the outside of a vacuum installation. The sequence of movements of the two piston-cylinder units which produce the L-shaped movement of the valve plate is controlled by means of a sequence control in such a way that the movements of the two piston-cylinder units proceed successively in the correct sequence.

Further, DE 196 33 798 A1 discloses a closure device for vacuum closure of an opening in a wall in which a housing is supported so as to be swivelable relative to the wall. First cylinder bore holes in which pneumatic pistons are supported so as to be displaceable are formed in the housing, and the piston rods of the pneumatic pistons carry the valve plate. The valve plate is displaced by means of these pistons between an open position in which the opening is released and a position in which the valve plate covers the opening but is raised from the wall. Second cylinder bore holes in which pneumatic pistons serving to swivel the housing are supported so as to be displaceable are provided in the housing. By actuating these pneumatic pistons, the housing can be swiveled so that the valve plate is pressed against the wall and the opening is closed in a vacuum-tight manner. A closure device of this kind can likewise be used as a door of a vacuum chamber. DE 196 33 798 A1 also describes an application as a valve arranged inside the vacuum.

When closure devices such as these which are described in U.S. Pat. No. 6,056,266 A and DE 196 33 798 A1 are to be used in applications in which there can be a vacuum on both sides of the opening in the wall, there is a considerable risk of leakage in the piston-cylinder units which are accordingly located in the vacuum area. The risk of leakage is present especially because of the increased pressure of the compressed air acting upon the piston. The resulting difference in pressure relative to the vacuum is substantially greater than the atmospheric pressure so that the risk of leakage is substantially higher. The damage which could occur in case of leakage is also generally greater compared to a leak relative to the atmosphere, since the pressure in case of a leak in the vacuum chamber is considerably greater than the atmospheric pressure so that, for example, bending of the chamber walls or additional leaks, e.g., in the area of welds, can occur.

Another closure device for vacuum closure of at least one opening in a wall is known from U.S. Pat. No. 6,427,973 B1. This closure device is also particularly suitable for closing and releasing a plurality of slot-shaped openings. A carrier plate which is displaceable in the plane of the wall, for example, by means of a tappet drive encapsulated in bellows, is provided for this purpose. Closure plates associated with the respective openings are supported at the carrier plate so as to be displaceable in the direction vertical to the wall, and the closure plates have guide pins which slide in corresponding bushings fastened to the carrier plate. A tight, expandable cylinder space is formed between the carrier plate and a respective closure plate by means of a bellows. The opening in the wall is closed in a vacuum-tight manner by admitting compressed air into this cylinder space. There can be a vacuum on both sides of the wall (in the closed state of the valve device as well as in the opened state of the valve device). This device is disadvantageous particularly in that the bellows forming the cylinder spaces must be constructed so as to be very stable in order to absorb the pressure of the compressed air admitted into the cylinder space. Also, there is a considerable risk of leakage in bellows of this kind particularly after an extended period of use and compressed air can escape into the vacuum chamber in case of leaks.

A further disadvantage in this valve device is that the closure plates can only be exchanged with difficulty. However, it is necessary to exchange the closure plate occasionally particularly when aggressive process gases are used. Also, the spaces encapsulated by the diaphragm bellows can only be accessed with difficulty.

Further, linear leadthroughs are known in which two sealing rings are arranged at a distance from one another between the part that is guided through and the wall of the vacuum chamber and the space between the two sealing rings is pumped out by means of a pump and a line leading into this space. This is intended to reduce the gas brought through the linear leadthrough into the vacuum.

OBJECT AND SUMMARY OF THE INVENTION

One object of the invention is to provide a closure device of the type mentioned in the beginning in which the risk of leakage is reduced. Another object of the invention is to provide a closure device which is easy to service while nevertheless reducing the risk of leakage. Another object of the invention is to provide a closure device of the type mentioned in the beginning which is suitable particularly for closing a plurality of slot-shaped openings. Another object of the invention is to provide a closure device of the type mentioned in the beginning in which there can be a vacuum area on both sides of the opening.

A closure device according to the invention for vacuum closure of at least one opening in a wall comprises a valve plate which is associated with a respective opening and which is displaceable between an open position in which it releases the opening, a position in which it covers the opening but is raised from the wall, and a closed position in which it covers the opening and contacts the wall, at least one piston-cylinder unit which serves to displace the valve plate between its open position and its position in which it covers the opening but is raised from the wall and which comprises a pneumatically actuated piston which is arranged in a cylinder housing and which is outfitted with a piston rod leading out of the cylinder housing through a bore hole, at least one carrier unit which is connected to the piston rod of the at least one piston-cylinder unit and which is associated with a respective valve plate, has at least one cylinder bore hole in which is arranged a pneumatically actuated piston which serves to displace the valve plate between its position in which it covers the opening but is raised from the wall and its closed position and which is outfitted with a piston rod leading out of the carrier unit through a bore hole, the valve plate being fastened to this piston rod, wherein the at least one cylinder bore hole of the at least one carrier unit is closed by a removable cover and at least two sealing rings are arranged between the cover and the carrier unit and a line which is connected to the atmosphere or can be evacuated leads into the space enclosed by the two sealing rings.

The removable cover makes it possible to install the piston in the cylinder bore hole of the carrier unit and also makes possible any subsequent servicing of this piston. The construction according to the invention substantially reduces the risk of a leak between the cover and the carrier unit. Also, the damage caused by a leak of this kind is substantially reduced.

In an advantageous embodiment form of the invention, the cover is provided on the side of the piston remote of the valve plate. The piston rod is guided out of the carrier unit through a bore hole in the latter and the piston rod is sealed relative to the carrier unit by means of at least two sealing rings arranged at the carrier unit, and a line which is connected with the atmosphere or can be evacuated leads into the space enclosed by these two sealing rings. In this way, the risk of a leak between the piston rod and the carrier unit is substantially reduced. It would also be conceivable and possible to arrange the cover on the side of the piston facing the valve plate. In this case, the piston rod can be guided out of the carrier unit through a bore hole in the cover. In this case, two sealing rings arranged at the walls of the bore hole in the cover can advantageously be provided for sealing between the cover and the piston rod, and a line which can be connected to the atmosphere or evacuated leads into the space enclosed by these two sealing rings.

In an advantageous embodiment form of the invention, it is further provided that the piston rod of the at least one piston-cylinder unit for displacing the at least one carrier unit relative to the cylinder housing out of which it is guided through a bore hole is sealed by means of at least two sealing rings arranged at the cylinder housing and a line which is connected with the atmosphere or can be evacuated leads into the space enclosed by these two sealing rings. This also substantially reduces the risk of leakage for these piston-cylinder units.

Further advantages and details of the invention are described in the following with reference to the embodiment examples shown in the drawings, from which further objects of the invention will become apparent.

BRIEF DESCRIPTION OF THE DRAWINGS

In the drawings:

FIG. 11 shows the left-hand and right-hand edge area of the valve in a section along line XI—XI of FIG. 5;

Figure 1:
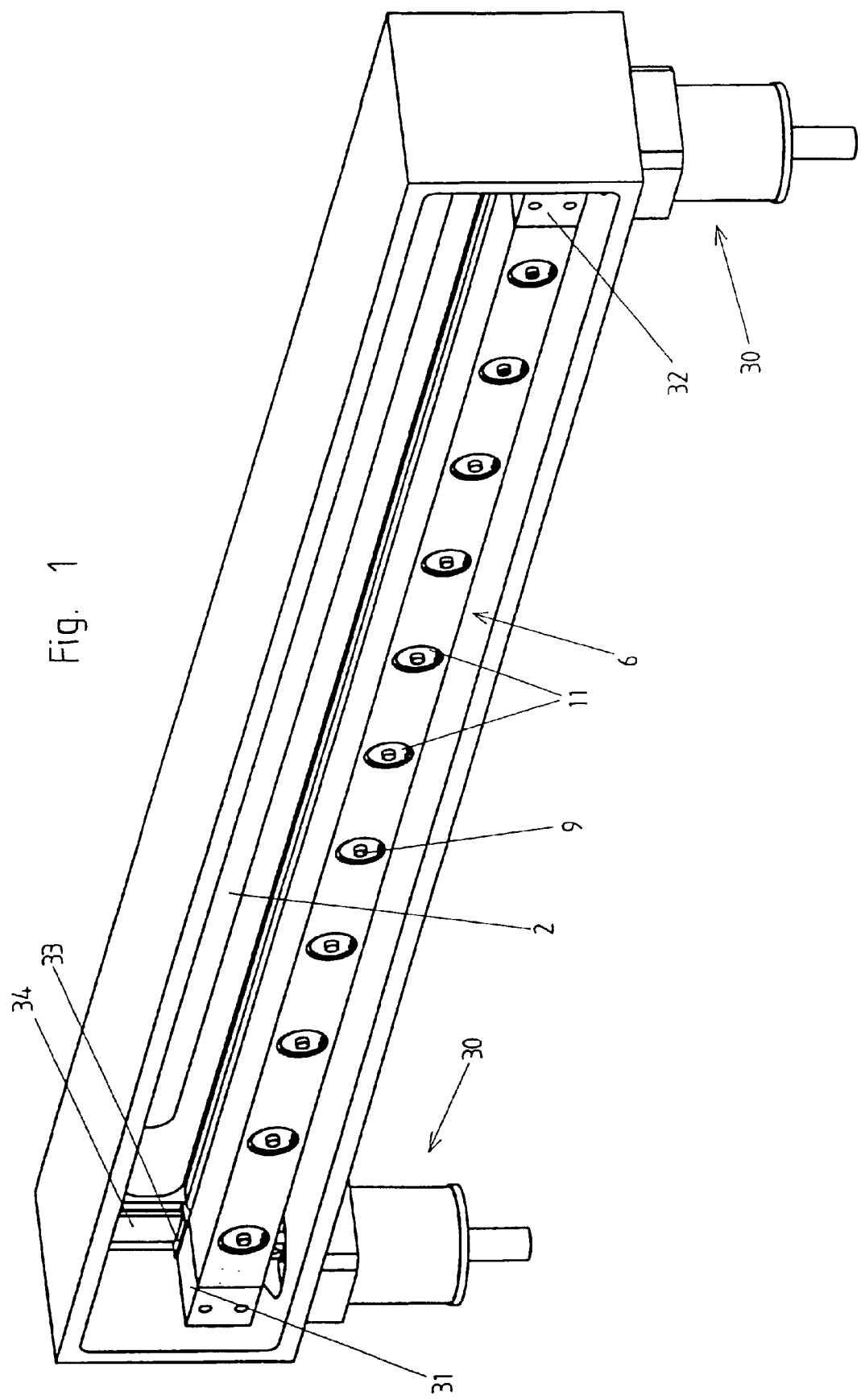
FIG. 1 shows a perspective view of a valve with a closure device according to the invention in the open state of the opening.

The Figures have different scales.

DESCRIPTION OF THE PREFERRED EMBODIMENTS

The embodiment example of a closure device according to the invention shown in FIGS. 1 to 11 serves for vacuum closure or vacuum sealing of an individual slot-shaped opening 2 in a wall 1. By the expression vacuum closure is meant herein that the opening 2 in the closed state of the closure device is closed in such a way that a vacuum can be maintained at least on one side of the wall (on the left-hand side of the wall with reference to FIG. 5). The closure device can also be constructed in such a way that it is stable with respect to differential pressure on both sides, i.e., a vacuum can be maintained on the left-hand side of the wall 1 with reference to FIG. 5 and there can be atmospheric pressure on the right-hand side with reference to FIG. 5 or, conversely, a vacuum can be maintained on the right-hand side of the wall with reference to FIG. 5 and there can be atmospheric pressure on the left-hand side with reference to FIG. 5. In the present context, a vacuum designates a pressure of less than $\frac{1}{100}$ of the atmospheric pressure.

The closure device has a valve plate 3 which is provided with a circumferentially closed sealing ring 4 that contacts the wall 1, namely, at a sealing surface 5 provided for this purpose in the area around the opening 2, in the closed position of the valve plate 3 (FIG. 5) in which the opening 2 is closed.

The valve plate 3 is supported by a bar-shaped carrier unit 6 and is accordingly displaceable relative to the carrier unit 6. For this purpose, the carrier unit 6 is provided with a plurality of cylinder bore holes 7 which are arranged at a distance from one another in longitudinal direction of the bar-shaped carrier unit. A piston 8 is supported so as to be displaceable in these cylinder bore holes 7. The piston 8 is outfitted with a piston rod 9. The valve plates 3 are fastened to the piston rods 9 of the piston 8. The piston rods 9 exit respectively from the carrier unit 6 through a bore hole 10.

The cylinder bore hole 7 is closed by a cover 11 on the side of the piston 8 remote of the valve plate 3. Further, a central bore hole 12 is formed in the cover 11. The piston rod 9 penetrates the piston 8 through a central bore hole, the piston 8 being fastened to the piston rod by means of retaining rings. The piston rod projects into the bore hole 12 in the cover 11 on the side of the piston 8 remote of the valve plate 3. The piston rod 9 is formed by a sleeve 13 and a threaded pin or bolt 14 which penetrates the sleeve 13, its head contacting the front side of the sleeve 13 remote of the valve plate 3, and is screwed into a threaded bore hole in the valve plate 3. The head of the threaded bolt 14 continues the sleeve 13 with the same diameter. To remove the valve plate 3, it is only necessary to unscrew the threaded bolts 14 by means of their heads which are accessible at the back of the carrier unit 6.

Two sealing rings 15, 16 which are arranged in grooves in the cover 11 or in grooves in the carrier unit 6 and each of which seals the cover 11 relative to the carrier unit 6 are arranged between the cover 11 and the carrier unit 6. A line 17 (see FIG. 7) leads into the space which is enclosed by the two sealing rings 15, 16 and which has the shape of an annular gap. This line 17 is connected to the atmosphere and accordingly is at atmospheric pressure as will be described more exactly in the following.

The piston rods 9 of the pistons 8 are sealed relative to the carrier unit 6 by means of two sealing rings 20, 21. These sealing rings 20, 21 are arranged in grooves in the wall of the bore hole 10 and contact the sleeve 13 of the piston rod 9. A line 22 (see FIG. 3 and FIG. 10) leads into the space which is enclosed by these two sealing rings 20, 21 and which has the shape of the annular gap. A groove 23 is formed in the carrier unit 6 for connecting the line 22 to this annular gap. The line 22 is connected to the atmosphere and is accordingly at atmospheric pressure as will be described more exactly in the following.

The piston rod 9 projecting into the bore hole 12 in the cover 11 is sealed relative to the cover 11 by means of two sealing rings 26, 27. These sealing rings are arranged in grooves in the cover 11 and contact the sleeve 13 and the head of the threaded bolt 14, respectively. A line 28 leads into the annular gap-shaped space between these two sealing rings 26, 27 and connects this space to the space located between the two sealing rings 15, 16, so that the space located between the two sealing rings 26, 27 is likewise at atmospheric pressure. A plurality of radial lines 28 of this type which are formed by channels or bore holes in the cover 11 can also be provided.

The carrier unit 6 is connected on both sides to the piston rods 29 of the two piston-cylinder units 30. For this purpose, fastening blocks 31, 32 are screwed to the bar-shaped carrier unit 6 on both sides. These fastening blocks 31, 32 are fastened in turn to sliding blocks 33 which are supported so as to be displaceable in the plane of the wall along guide rails 34 which are fastened to the wall 1. The guide rails 34 engage in an undercut groove in the sliding block 33, so that the sliding block 33 is prevented from rising from the guide rail 34 in the direction vertical to the wall. The piston rods 29 of the piston-cylinder units 30 are screwed to the sliding blocks 33.

Each of the piston-cylinder units 30 has a cylinder housing 35 with a piston 36 which is supported so as to be displaceable therein and which is outfitted respectively with the piston rod 29 which was mentioned above. Compressed air can be alternately applied to and removed from the cylinder spaces on both sides of the piston 36 via lines 37, 38 to which corresponding compressed air lines, not shown in the drawing, are connected, wherein the pistons 36 are displaced and the carrier unit is displaced in the direction parallel to the surface of the wall 1 or vertical to the axis 39 of the opening 2.

The piston rods 29 exit respectively from the cylinder housing 35 through a bore hole 40. Two sealing rings 41, 42 arranged in grooves in the cylinder housing are provided for sealing the respective piston rod 29 relative to the cylinder housing 35 and contact the surface of the piston rod 29 in a sliding manner. A line 43 leads into the space which is located between the two sealing rings 41, 42 and which has the shape of the annular gap. As can be seen from FIG. 11, this line 43 leads to the atmosphere and is accordingly at atmospheric pressure.

The respective piston rod 29 penetrates the piston 36 attached to it and projects through a bore hole 44 in the cylindrical cover 45 which is arranged on the side of the piston 36 remote of the carrier unit 6. Lines 19, 25 which are formed by channels 19, 25 penetrating the piston rod in longitudinal direction are provided in the piston-cylinder unit 30 shown at left in FIG. 11. By way of channels, not shown in the drawing, in the sliding block 33 on the left-hand side and lines 18, 24 formed by channels in the fastening block 31 on the left hand side, the lines 19, 25 communicate with lines 17, 22 formed by channels arranged in the carrier unit. Since the lines 19, 25 open out on the front side of the end of the piston rod 29 which passes through the cylindrical cover 45 and lies outside of the cylinder space and are therefore connected to the atmosphere and are at atmospheric pressure, the lines 17, 22 are likewise at atmospheric pressure. Lines 46, 47 which extend longitudinally and are formed by channels are arranged in the piston rod 29 shown at right in FIG. 11. By way of channels (not visible in the drawing) which are arranged in the sliding block 33 shown at right in FIG. 11 and channels which are arranged in the fastening block 32 on the right-hand side, these lines 46, 47 communicate with channels which form lines 50, 51 and which penetrate the carrier unit 6 in longitudinal direction. The lines 50, 51 open out into the cylinder spaces on both sides of the piston 8 in the carrier unit 6. The pistons 8 can be displaced in the cylinder bore holes 7 by alternately applying compressed air to the lines 46, 47 and venting compressed air from the lines 46, 47 (via compressed air lines, not shown in the drawing, which connect to the lines 46, 47), these lines 46, 47 opening out at the front side of the end of the piston rod 29 exiting from the cylindrical cover 45.

Figure 2:
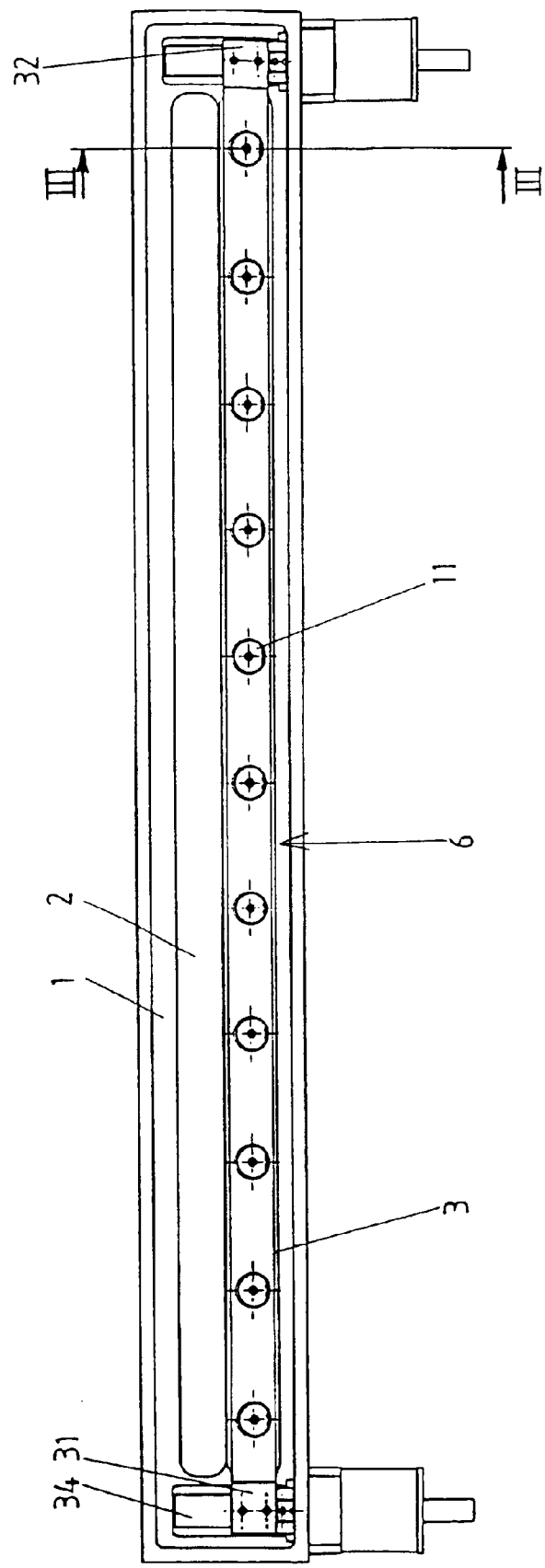
FIG. 2 shows a view of the valve of FIG. 1.
Figure 3:
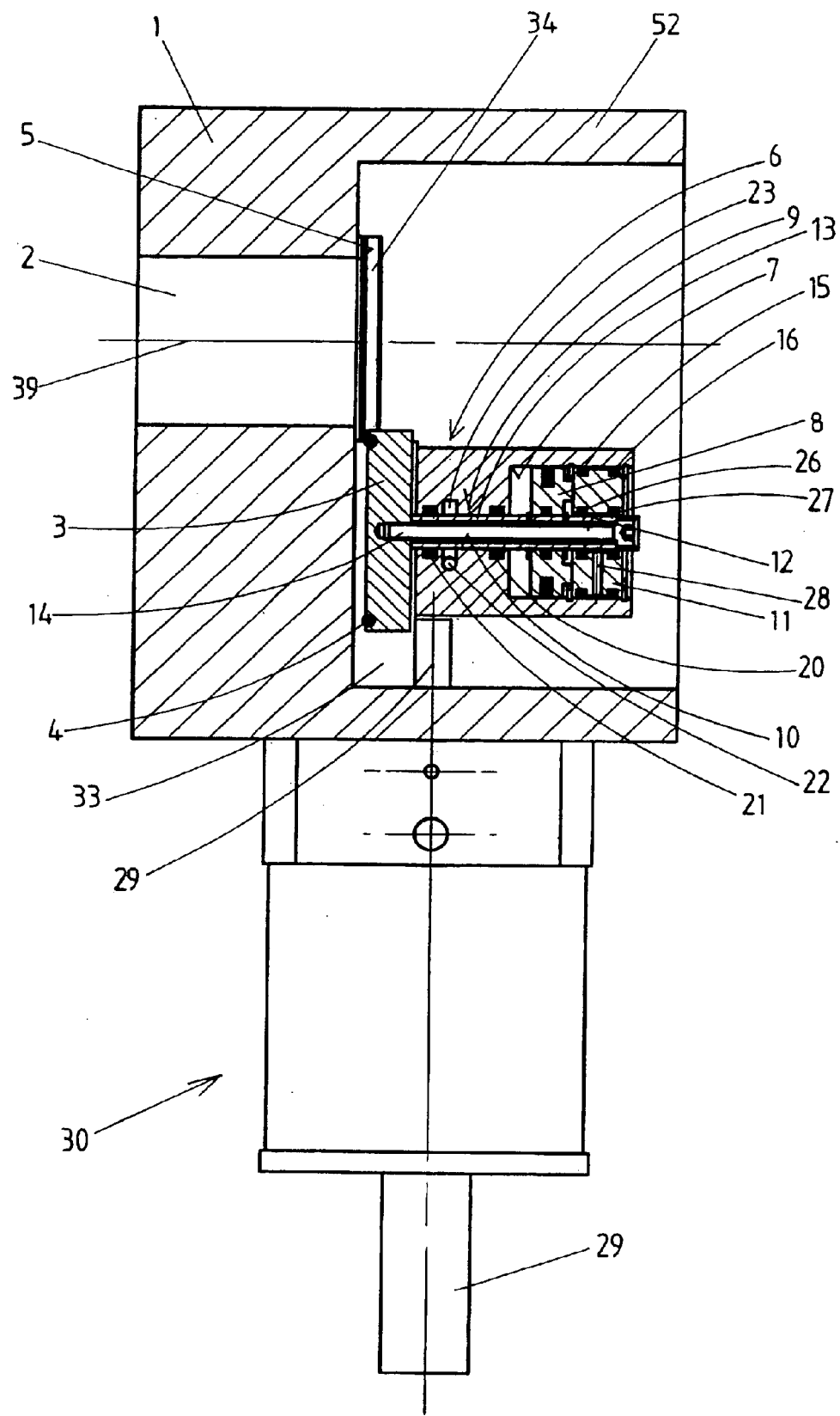
FIG. 3 shows a section along line III—III of FIG. 2.
Figure 4:
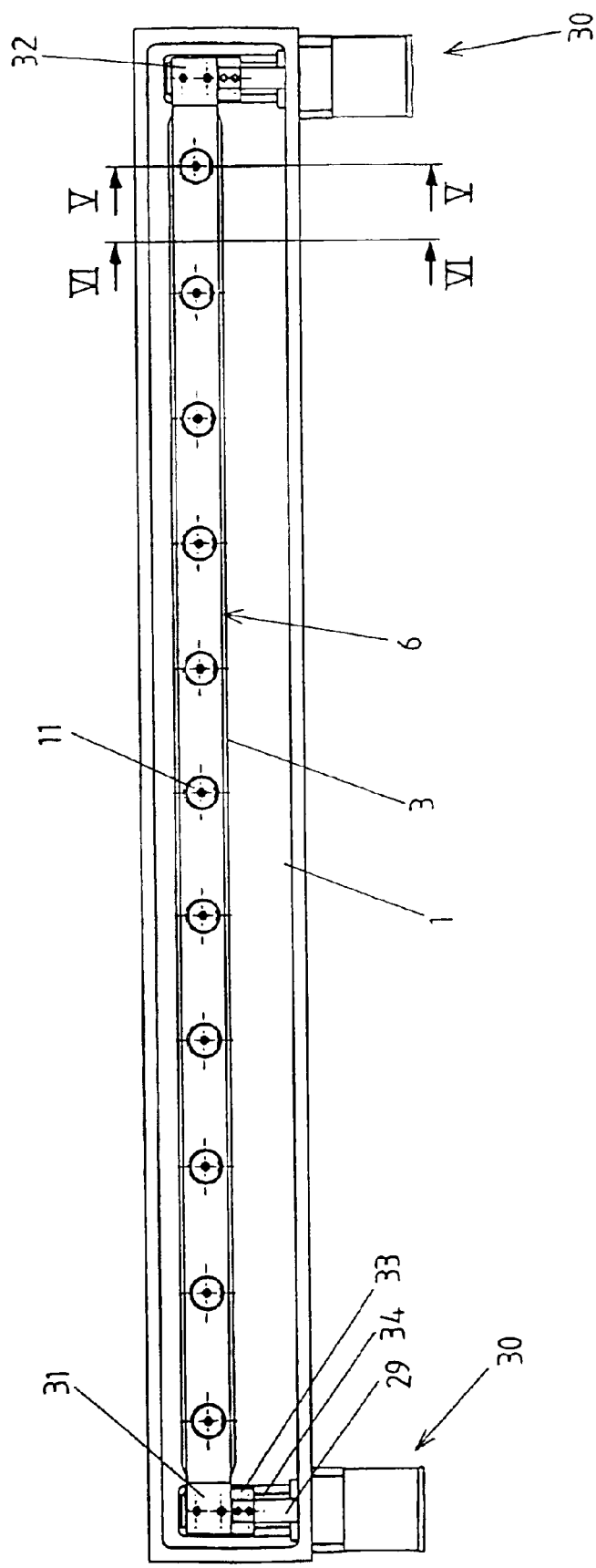
FIG. 4 shows a view corresponding to FIG. 2 in the closed state of the opening.
Figure 5:
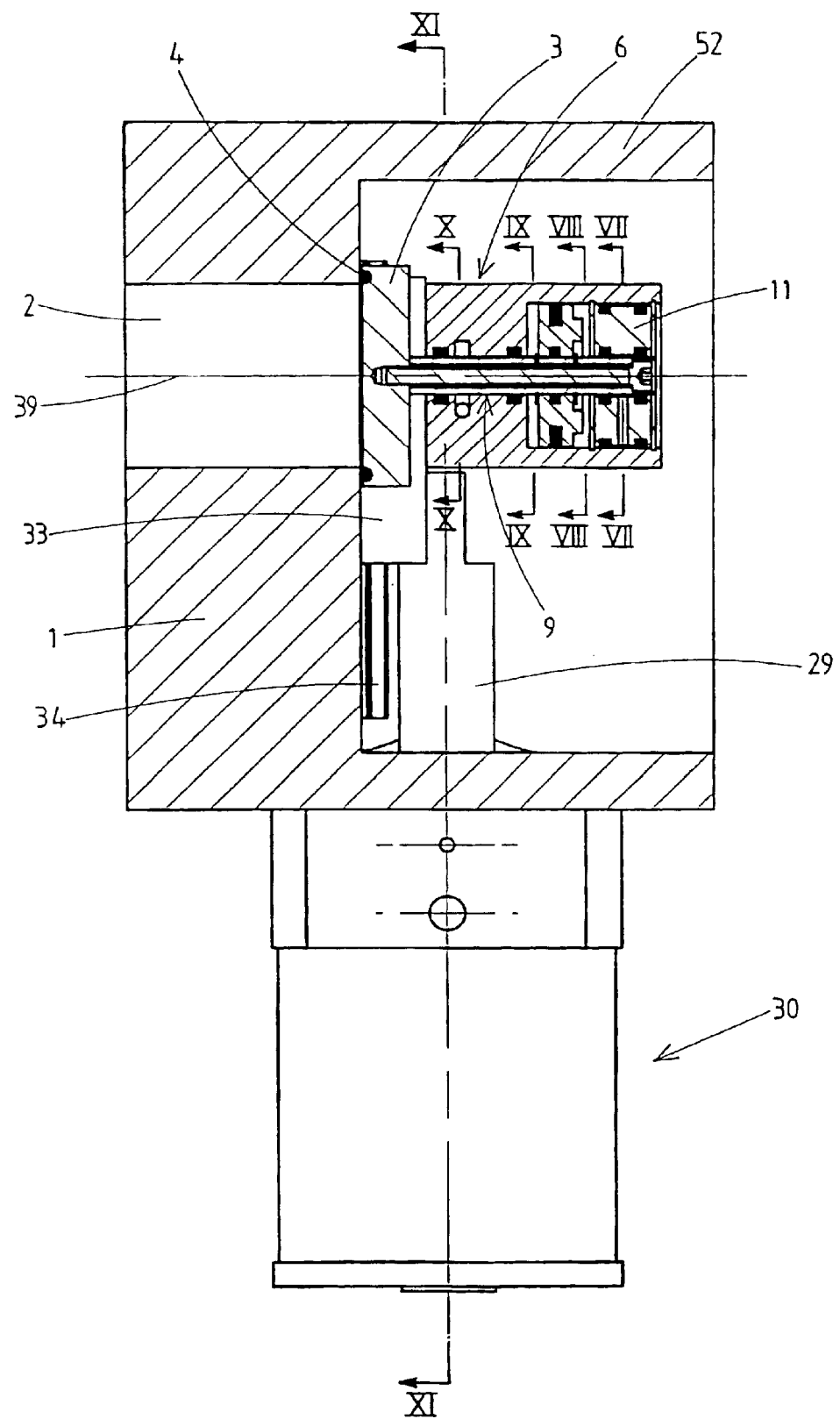
FIG. 5 shows a section along line V—V of FIG. 4.
Figure 6:
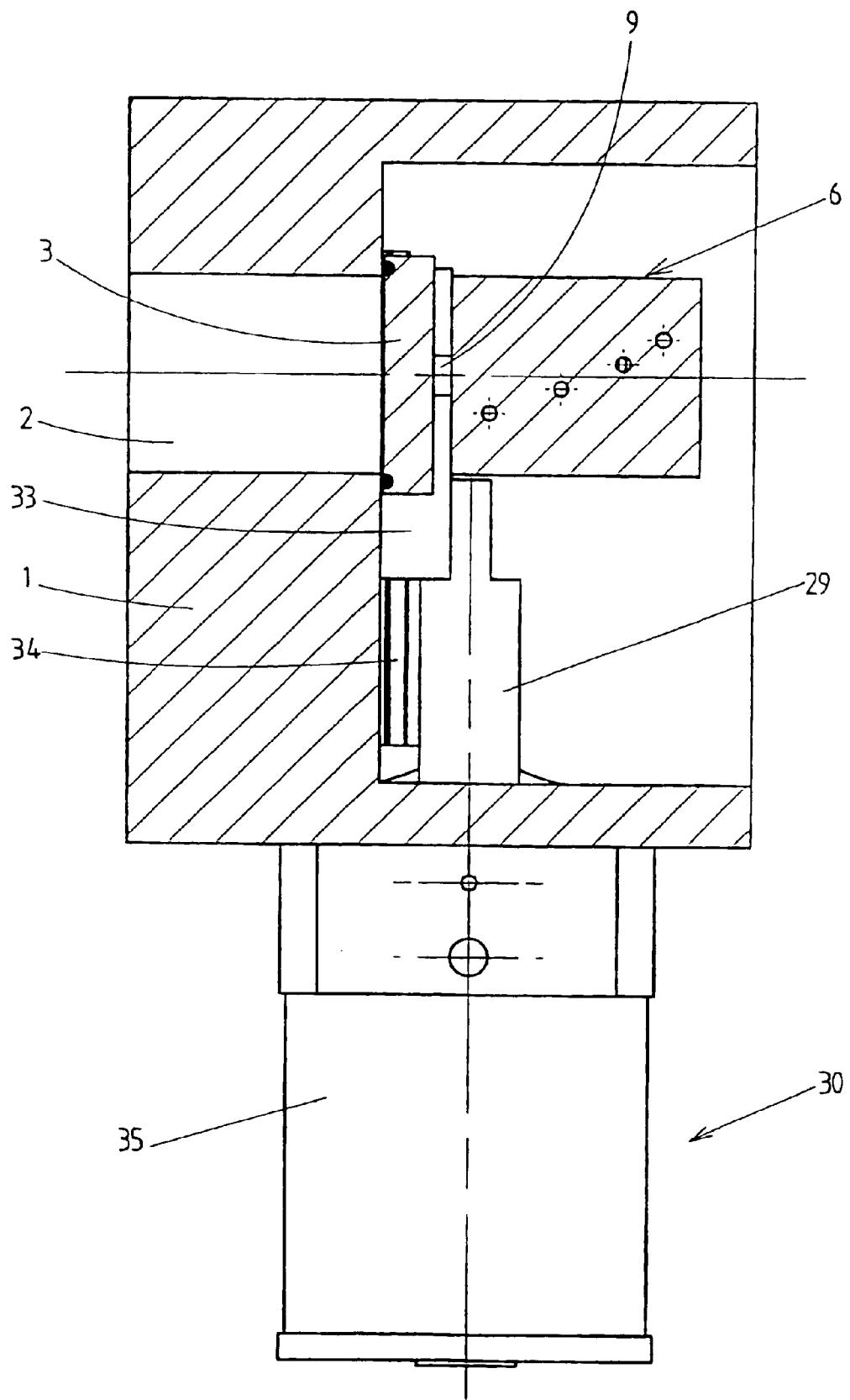
FIG. 6 shows a section along line VI—VI of FIG. 4.
Figure 7:
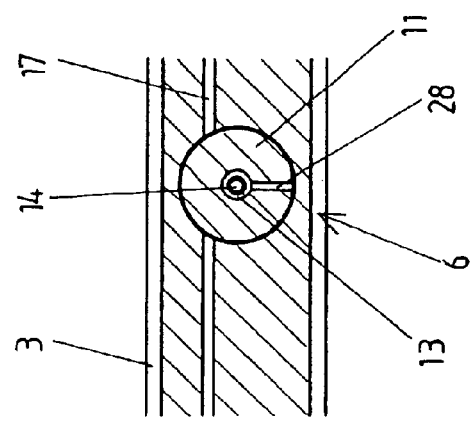
FIGS. 7 to 10 shows partial sections of the bar-shaped carrier unit along lines VII—VII, VIII—VIII, IX—IX and X—X of FIG. 5.
Figure 8:
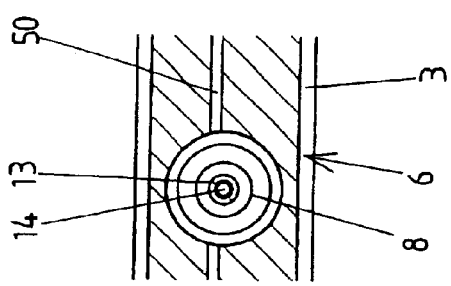
Figure 9:
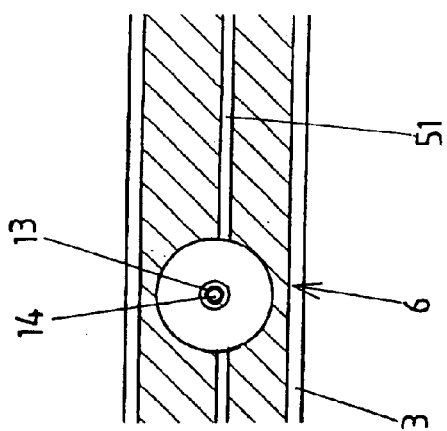
Figure 10:
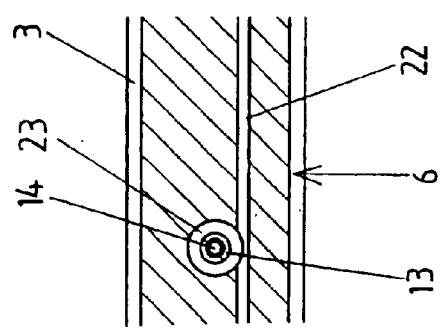
Figure 12:
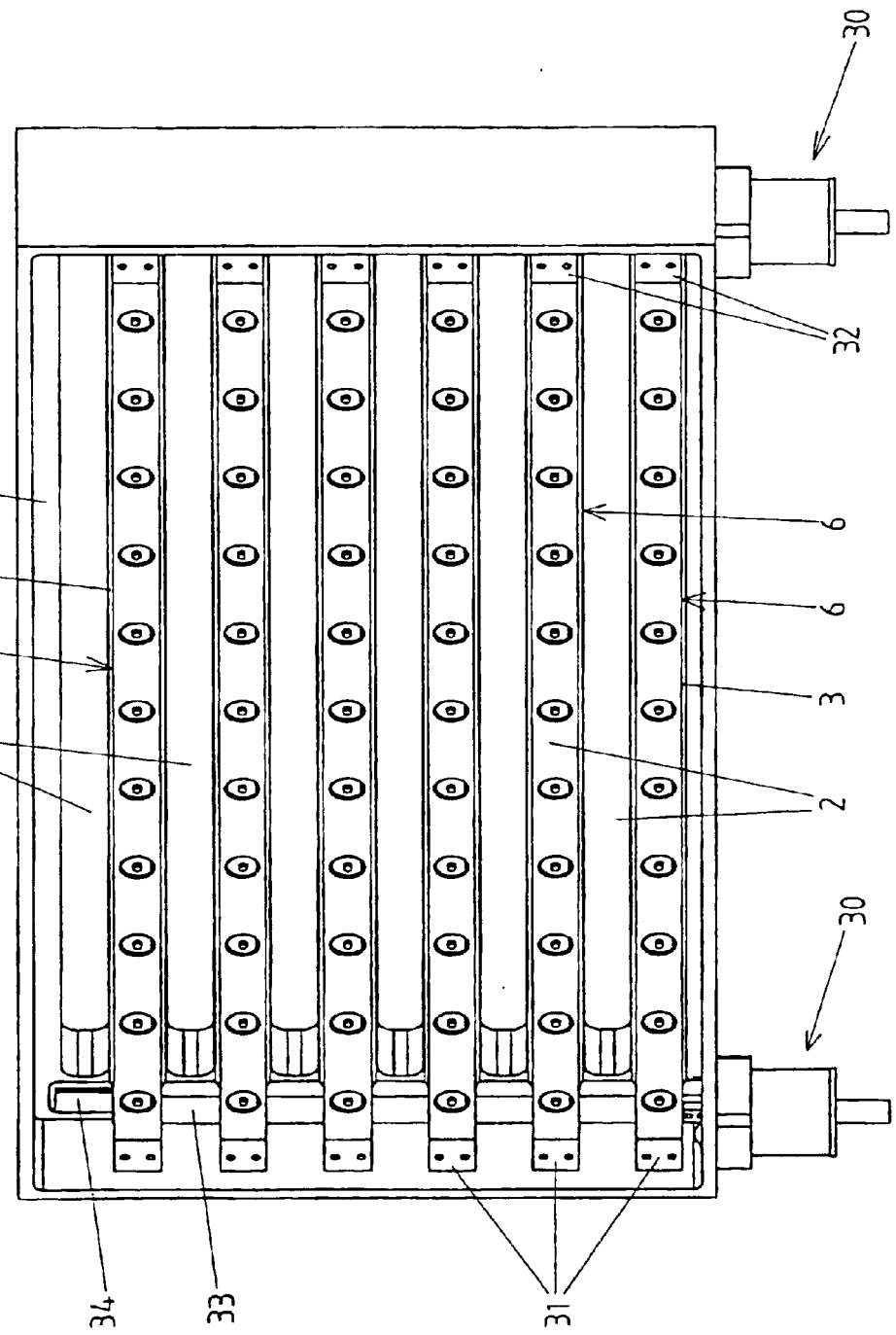
FIG. 12 shows a perspective view of a valve having another embodiment example of a closure device according to the invention in the open state of the valve.
Figure 13:
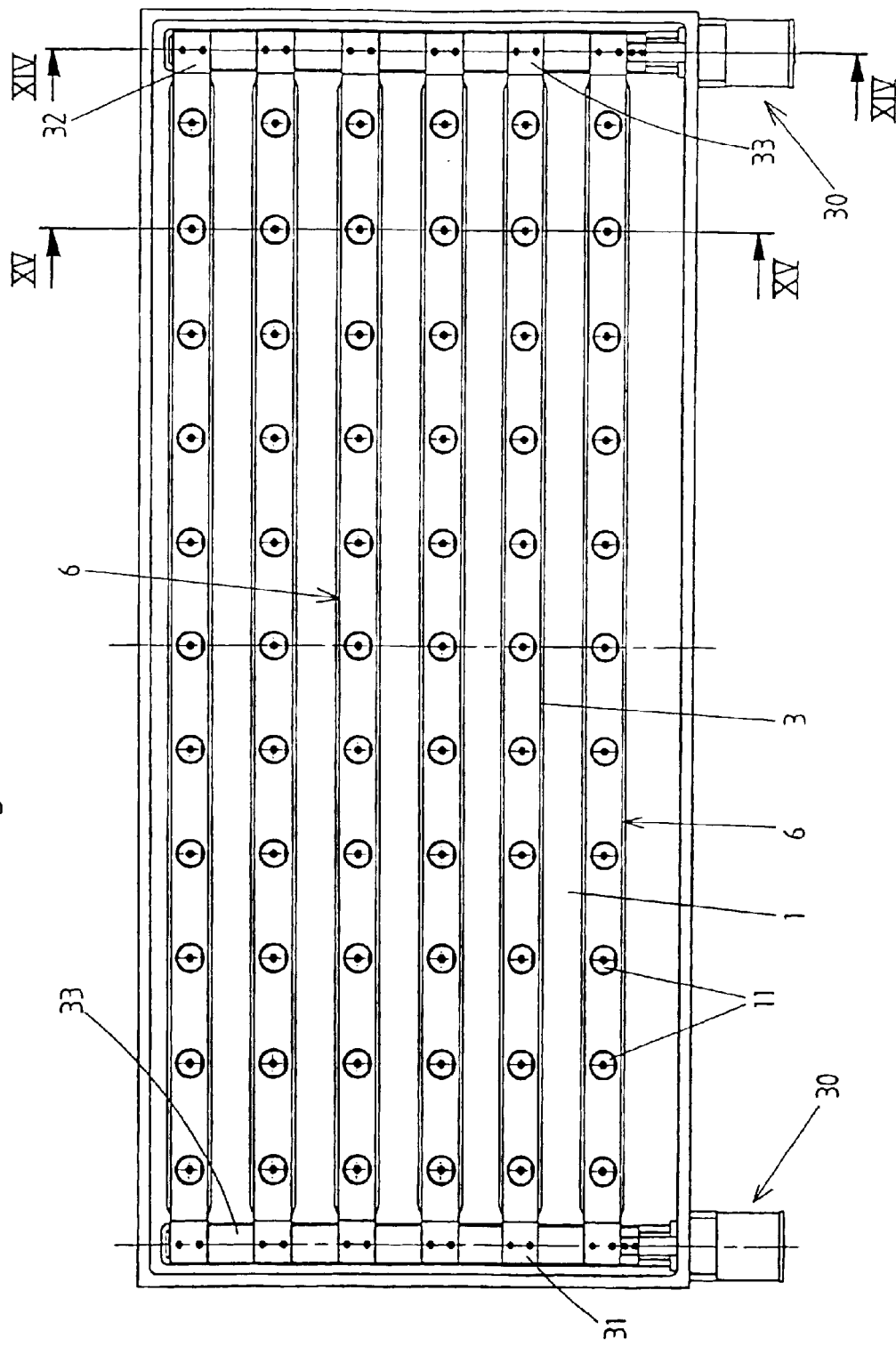
FIG. 13 shows a view of the valve of FIG. 12 in the closed state.
Figure 14:
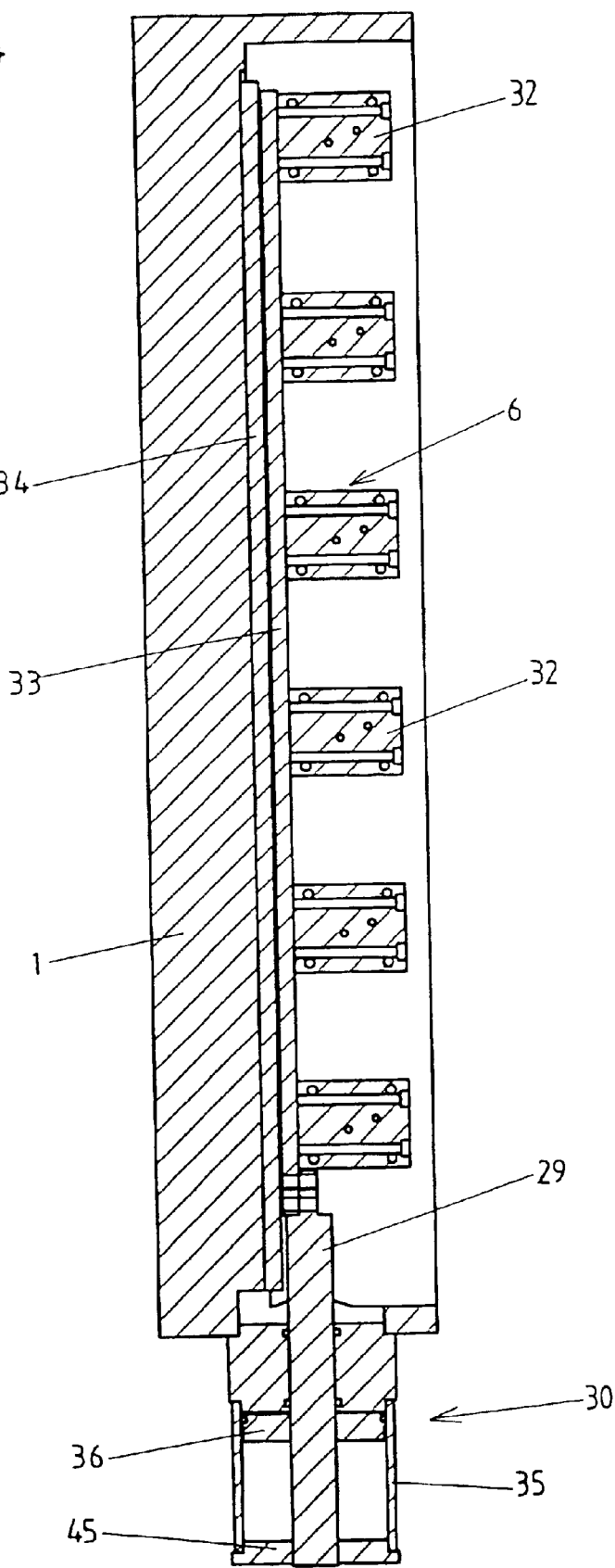
FIG. 14 shows a section along line XIV—XIV of FIG. 13.
Figure 15:
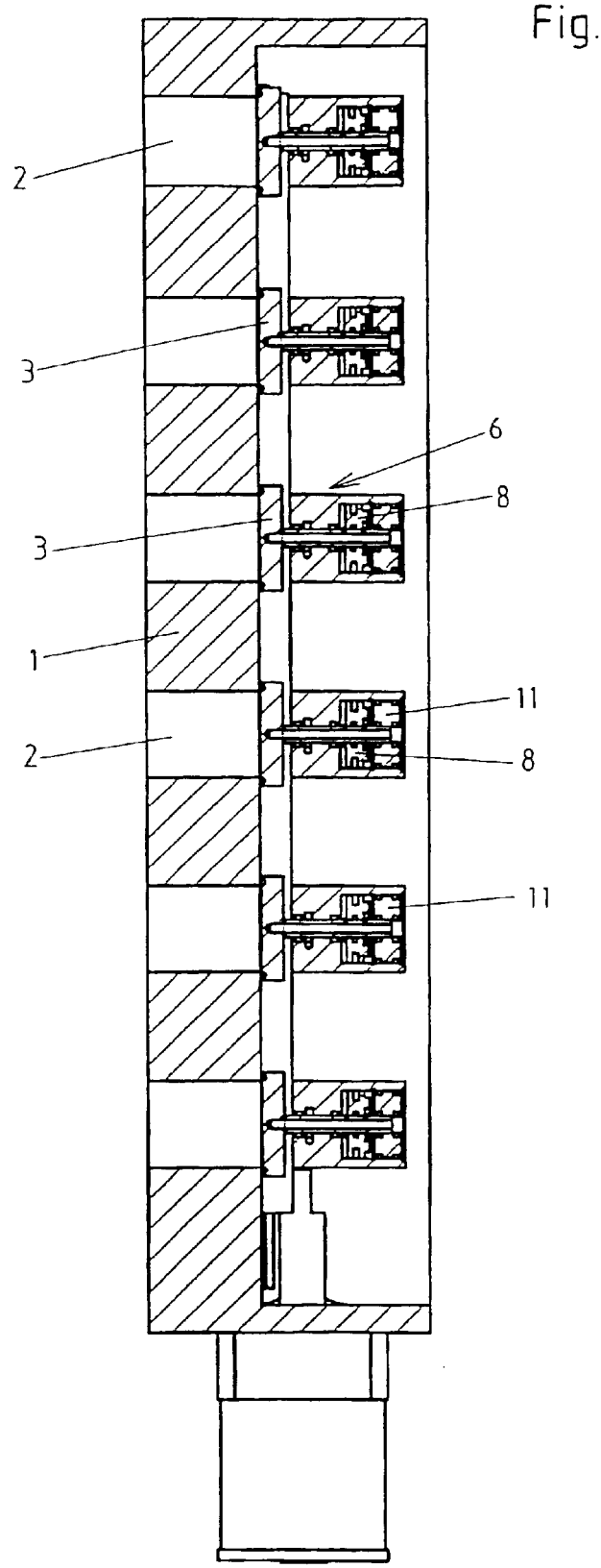
FIG. 15 shows a section along line XV—XV of FIG. 13.

FIGS. 1, 2 and 3 show the open position of the valve plate 3 in which the opening 2 is completely open and the valve plate is raised from the wall 1. Starting from this position, the pistons 36 of the piston-cylinder units 30 are initially acted upon by compressed air via lines 38 (and lines 37 are vented) for closing the opening 2, and the carrier unit 6 is displaced upward with reference to the drawing until the valve plate lies opposite the opening 2 and the opening is accordingly covered in the direction of the longitudinal axis 39 of the opening. However, the valve plate 3 is still raised from the wall 1. Compressed air is then applied to line 46 (and line 47 is vented) and the cylinder spaces located to the right of the pistons 8 are acted upon via line 50, so that the pistons 8 and, therefore, the valve plate 3 are displaced in the direction of the wall 1 (parallel to the direction of the longitudinal axis 39) and the valve plate 3 is pressed against the wall 1, whereupon it has reached its closed position shown in FIGS. 4 to 11.

In the embodiment example shown in FIGS. 1 to 11, the closure device forms a part of a vacuum valve. For this purpose, the wall 1 having at least one opening 2 is connected in a vacuum-tight manner with a wall 52 which projects over the wall 1 on the side of the valve plate and carrier unit and which surrounds the valve plate and the carrier unit in the manner of a frame. The walls 1 and 52 can be constructed such that they form one piece with one another. The wall 52 defines the vacuum area of the valve and the piston rods 29 of the piston-cylinder units 30 penetrate openings 53 in this wall 52, each of which is closed by the cylinder housing 35. The flanges for connecting this vacuum valve, e.g., to a vacuum chamber, are not shown in the drawing and can be constructed in conventional manner.

On the other hand, the wall 1 could just as easily be the wall of a vacuum chamber or the intervening wall between two vacuum chambers. In the latter case, a closure device according to the invention can form a transfer valve between two vacuum chambers. In this case, the piston rods 29 can be guided in a vacuum-tight manner out of the vacuum chamber in which the valve plate and the carrier unit 6 are arranged, for example, in the manner shown in FIGS. 1 to 11.

In principle, it would also be conceivable and possible for the piston-cylinder units 30 to be arranged in a vacuum area of the vacuum installation. In that case, two sealing rings arranged between the respective cylindrical cover 45 and the respective piston rod 29 could also be provided in each instance for guiding the piston rods 29 through the cylindrical cover 45, wherein a line connected to the atmosphere (or evacuated by means of a pump device) leads into the space defined by the two sealing rings. In this case, corresponding extension lines connected to the atmosphere would have to be connected to the lines which pass out of the piston rods 29 and cylinder housing 35 and which are to be connected to the atmosphere.

Neither the compressed air lines connected to lines 37, 38 and lines 46, 47 nor the associated control valves are shown in the drawings. They can be constructed in conventional manner and can be controlled, for example, by a memory-programmable control device in the manner of a sequence control.

Instead of connecting lines 17, 22 and 43 to the atmosphere, these lines could also be pumped out or evacuated by means of a pump device (for lines 17, 22 this is carried out by connecting the pump device to lines 19, 25). It is normally not necessary to evacuate lines 17, 22 and 43 in this way, particularly when using a closure unit of a transfer valve between two vacuum chambers, since small quantities of entrained gas normally have no effect due to the size of the vacuum installations in which such transfer valves are used and due to the available pumping capacities.

Another embodiment form of the invention is shown in FIGS. 12 to 15. In contrast to the embodiment example described above, the wall 1 is provided with a plurality of slot-shaped openings 2 in this case. Analogous parts in FIGS. 12 to 15 are provided with the same reference numbers as in FIGS. 1 to 11. By slot-shaped opening is meant herein an opening whose length is at least three times as large as its width. A closure device according to the invention is especially suitable for a closure of this type for a plurality of slot-shaped openings 2. For this purpose, it is necessary only to provide a corresponding quantity of carrier units 6, each of which carries a valve plate 3. In this case, the guide rails 34 extend over the height of the wall 1 provided with openings 2 and over a portion located below the bottommost opening 2. The sliding block 33 has a length extending from the topmost opening 2 to the bottommost opening 2 and a plurality of carrier units 6 are fastened to the two sliding blocks 33, the distance between the carrier units 6 corresponding to the distance between the openings 2. In this way, the carrier units 6 can be displaced by means of the piston-cylinder units 30 simultaneously in a plane parallel to the wall 1. In their open positions, the valve plates lie in front of the wall portions between the openings 2. The carrier units 6 and the piston-cylinder units 30 can be constructed in the same way as in the embodiment example according to FIGS. 1 to 11.

Figure 16:
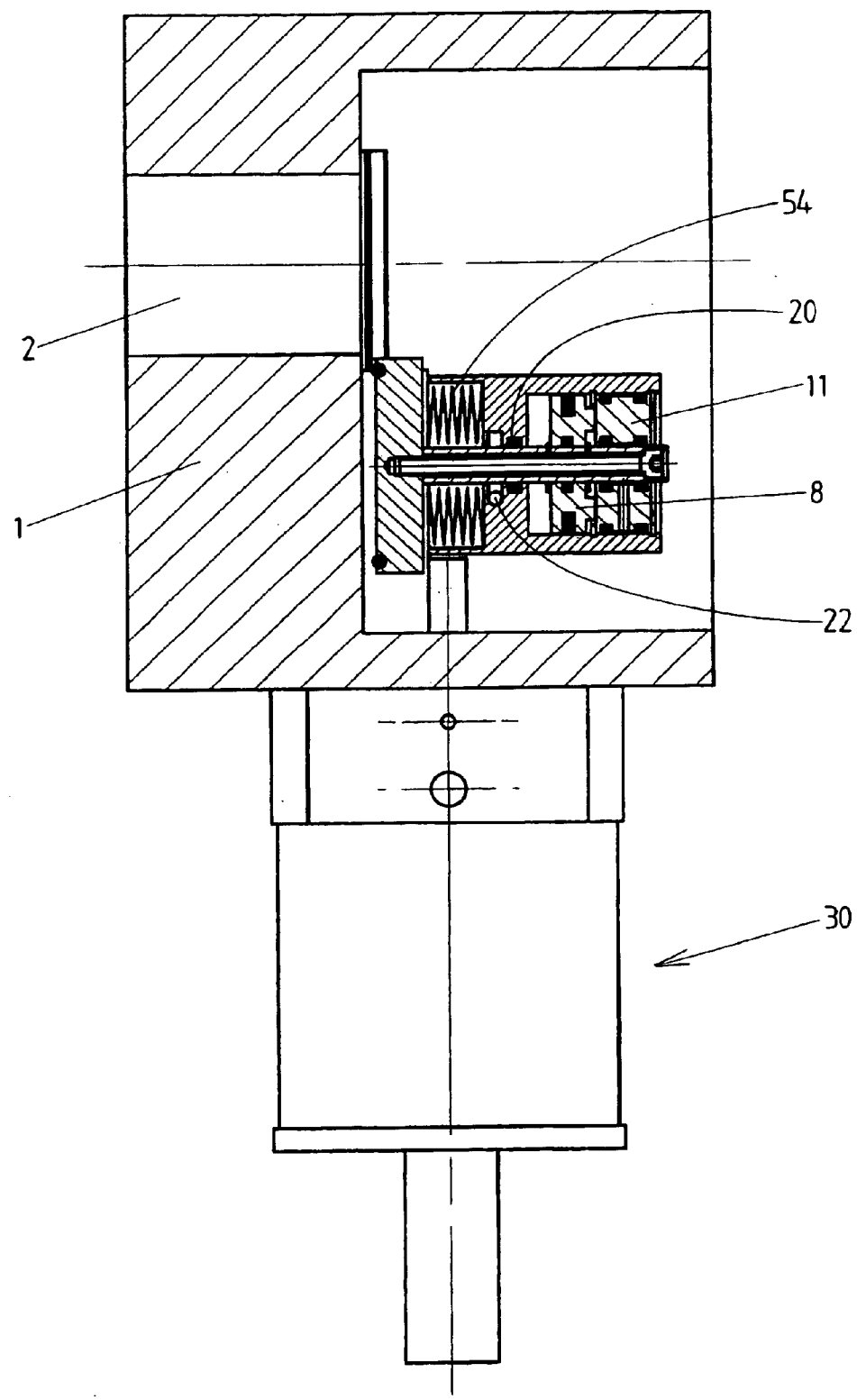
FIG. 16 shows another embodiment form of a closure device according to the invention in a section analogous to FIG. 3.

FIG. 16 shows a modification of the invention. In this case, only one sealing ring 20 is arranged in a groove of the bore hole of the carrier unit 6 for sealing the piston rod 9 relative to the carrier unit 6. A bellows 54 is provided for this purpose. The bellows 54 is connected to the carrier unit 6 at one end so as to be vacuum-tight and is connected to the piston rod 9 (or the value plate 3) at the other end so as to be vacuum-tight. A line 22 which is connected to the atmosphere or is evacuated by means of a pumping device leads into the space enclosed by the sealing ring 20 and by the bellows 54.

A similar construction would also be conceivable and possible for guiding the piston rods 29 out of the cylinder housings 35.

Figure 17:
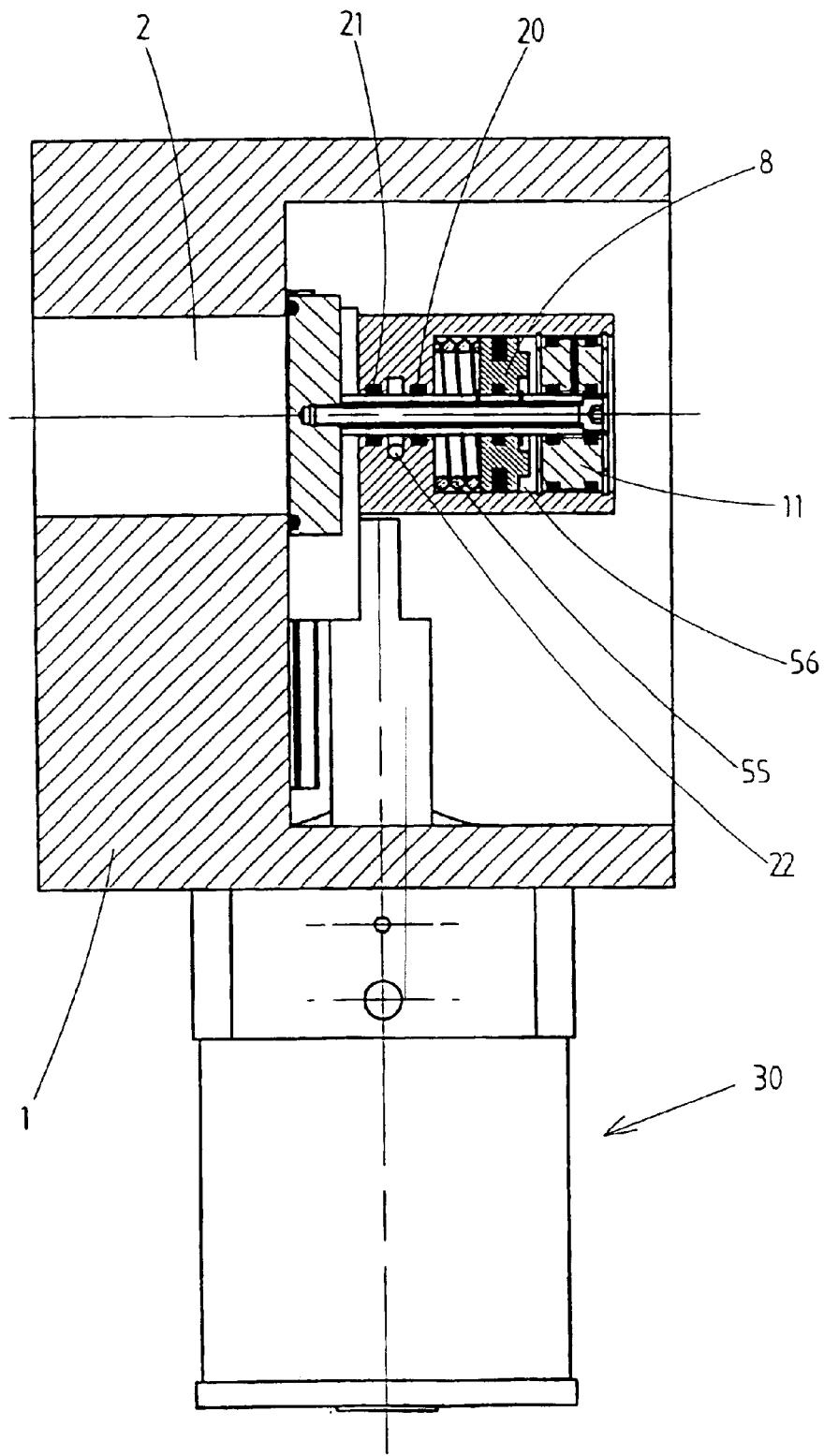
FIG. 17 shows another embodiment form of a closure device according to the invention in a section analogous to FIG. 3.

Another constructional variant of the invention is shown in FIG. 17. The piston 8 is acted upon by means of a spring 55 in a displacing direction, namely, in the direction for raising the valve plate 3 from the wall 1. The piston 8 is acted upon as before in the other direction by admitting compressed air into the cylinder space 56, so that it is displaced in the other direction (toward the left in FIG. 17) against the force of the spring. Since there is no need to apply compressed air in the cylinder space in which the spring 55 is arranged, this cylinder space could also be permanently connected to the atmosphere or evacuated (by means of a line corresponding to line 51 in FIG. 9). The sealing ring 20 and the line 22 could also be dispensed with in this case.

In an analogous manner, the pistons 36 of the piston-cylinder units 30 could also be acted upon in one direction by means of a spring. When this direction is downward with reference to the drawings, the cylinder space located above the piston 36 could also be permanently connected to the atmosphere or pumped out, in which case the sealing ring 42 and the line 43 can also be omitted in principle.

As will be appreciated from the preceding description, the field of the invention is not limited to the embodiment examples shown herein, but rather should be defined with reference to the appended claims together with their full range of possible equivalents.

While the foregoing description and drawings represent the present invention, it will be obvious to those skilled in the art that various changes may be made therein without departing from the true spirit and scope of the present invention.

What is claimed is:

1. A closure device for vacuum closure of at least one opening in a wall, comprising:
   a valve plate which is associated with a respective opening and which is displaceable between an open position in which it releases the opening, a position in which it covers the opening but is raised from the wall, and a closed position in which it covers the opening and contacts the wall;
   at least one piston-cylinder unit which serves to displace the valve plate/between its open position and its position in which it covers the opening but is raised from the wall and which comprises a pneumatically actuated piston which is arranged in a cylinder housing and which is outfitted with a piston rod leading out of the cylinder housing through a first bore hole;

at least one carrier unit which is connected to the piston rod of the at least one piston-cylinder unit and which is associated with a respective valve plate, having at least one cylinder bore hole in which is arranged the pneumatically actuated piston which serves to displace the valve plate between its position in which it covers the opening but is raised from the wall and its closed position and which is outfitted with a piston rod leading out of the carrier unit through the first bore hole, the valve plate being fastened to said piston rod;

said at least one cylinder bore hole of the at least one carrier unit being closed by a removable cover;

at least a first pair of sealing rings being arranged between said cover and the carrier unit; and a first line which is connected to the atmosphere or can be evacuated leading into a space enclosed by the two sealing rings.

2. The closure device according to claim 1, wherein said line is constructed as a channel which leads through the carrier unit and subsequently through the piston rod of the piston-cylinder unit, which piston rod is connected to the carrier unit, or which leads through one of these piston rods.

3. The closure device according to claim 1, wherein a central bore hole through which the piston rod passes is arranged in the cover, and wherein at least a second pair of sealing rings are arranged between the cover and the piston rod, and a second line which is connected with the atmosphere or can be evacuated leads into the space enclosed by the second pair of sealing rings.

4. The closure device according to claim 3, wherein the piston rod has a sleeve penetrating the piston and leading through the central bore hole in the cover and a bolt which penetrates the sleeve and which is screwed into a threaded bore hole in the valve plate.

5. The closure device according to claim 1, wherein the piston rod of the pneumatically actuated piston which is arranged in the at least one carrier unit and which is guided out of the carrier unit through the first bore hole of the carrier unit is sealed by the at least first pair of sealing rings arranged at the carrier unit or by one of the first pair of sealing rings arranged at the carrier unit and a bellows extending between the carrier unit and the piston rod or valve plate, and wherein a second line which is connected with the atmosphere or which can be evacuated leads into the space enclosed by the at least first pair of sealing rings or in the space enclosed by the at least one of the first pair of sealing rings and the bellows.

6. The closure device according to claim 1, wherein all lines leading to the at least one carrier unit are constructed as channels which lead through the carrier unit and subsequently through the piston rod of the piston-cylinder unit, which piston rod is connected to the carrier unit, or through one of these piston rods.

7. The closure device according to claim 1, wherein the piston rod of the at least one piston-cylinder unit for displacing the at least one carrier unit relative to the cylinder housing from which it is guided out through a second bore hole is sealed by means of at least a third pair of sealing rings arranged at the cylinder housing or by means of at least one of the third pair of sealing rings arranged at the cylinder housing and a bellows extending between the cylinder housing and the piston rod, and wherein a third line which is connected with the atmosphere or which can be evacuated leads into the space enclosed by the at least third pair of sealing rings or by the at least one of the third pair of sealing rings and the bellows.

8. The closure device according to claim 1, wherein the closure device has a plurality of valve plates for closing a plurality of slot-shaped openings, and a bar-shaped carrier unit is provided for every valve plate, and the carrier units are connected to the piston rods of at least two piston-cylinder units which jointly displace the carrier units.

9. The closure device according to claim 1, wherein a wall which surrounds the at least one valve plate and the at least one carrier unit and which defines a vacuum area is connected in a vacuum-tight manner to the wall having at least one opening, which wall has at least one through-opening for the piston rod of the at least one piston-cylinder unit which is closed in a vacuum-tight manner by the cylinder housing of the piston-cylinder unit.

10. The closure device according to claim 1, wherein the at least one carrier unit is guided via a guide so as to be displaceable in a direction parallel to the wall, wherein this guide opposes a displacement of the at least one carrier unit in direction vertical to the wall.

11. The closure device according to claim 10, wherein the carrier unit is connected on both sides to sliding blocks which are displaceable in longitudinal direction of guide rails but can not be lifted from the guide rails.

12. The closure device according to claim 1, wherein the wall is part of a vacuum chamber or part of a plurality of vacuum chambers.

13. The vacuum valve with a closure device according to claim 1, wherein the wall having at least one opening forms a part of a valve body.

* * * * *